(12) United States Patent
Hamilton

(10) Patent No.: US 8,875,194 B2
(45) Date of Patent: Oct. 28, 2014

(54) MULTIZONE AUDIO-VISUAL SYSTEM

(76) Inventor: Keith A. Hamilton, Claygate (GB)

( * ) Notice: Subject to any disclaimer, the term of this patent is extended or adjusted under 35 U.S.C. 154(b) by 0 days.

(21) Appl. No.: 13/881,146

(22) PCT Filed: Nov. 9, 2011

(86) PCT No.: PCT/GB2011/001576
§ 371 (c)(1),
(2), (4) Date: Apr. 23, 2013

(87) PCT Pub. No.: WO2012/069775
PCT Pub. Date: May 31, 2012

(65) Prior Publication Data
US 2013/0291030 A1    Oct. 31, 2013

(30) Foreign Application Priority Data

Nov. 24, 2010  (GB) ................................. 1019871.1

(51) Int. Cl.
*H04H 60/33* (2008.01)
*H04H 60/32* (2008.01)
*G06F 3/00* (2006.01)
*G06F 13/00* (2006.01)
*H04N 5/445* (2011.01)
*H04N 7/18* (2006.01)
*H04N 7/16* (2011.01)

(52) U.S. Cl.
USPC ........ 725/82; 725/9; 725/14; 725/37; 725/38; 725/74; 725/78; 725/135; 725/139

(58) Field of Classification Search
CPC ....... H04N 21/24; H04N 21/25; H04N 21/40; H04N 21/41
See application file for complete search history.

(56) References Cited

U.S. PATENT DOCUMENTS

2004/0148632 A1*  7/2004  Park et al. ........................ 725/81
2011/0145847 A1*  6/2011  Barve et al. ........................ 725/9

* cited by examiner

*Primary Examiner* — Justin Shepard

(57) ABSTRACT

A multi-zone audio-visual (AV) system that includes: (a) one or more AV devices (such as a TV) operable to provide audio and/or visual information; (b) a set-top box (STB) associated with each AV device; (c) a router; (d) an Ethernet connection between each STB and the router; and (e) a control server which operates to receive and record data from the router, the data including data indicative of the operating status (e.g., on or off) of the or each AV device, the operating configuration (e.g., TV channel) and the time of each change of status and/or configuration of the or each AV. The system comprises at least two remote AV control devices (Human Interface Devices, "HIDs") for each AV device. The HIDs associated with each AV device operate to be automatically synchronized to the same status and configuration. The system may include a web server and a content server.

13 Claims, 1 Drawing Sheet

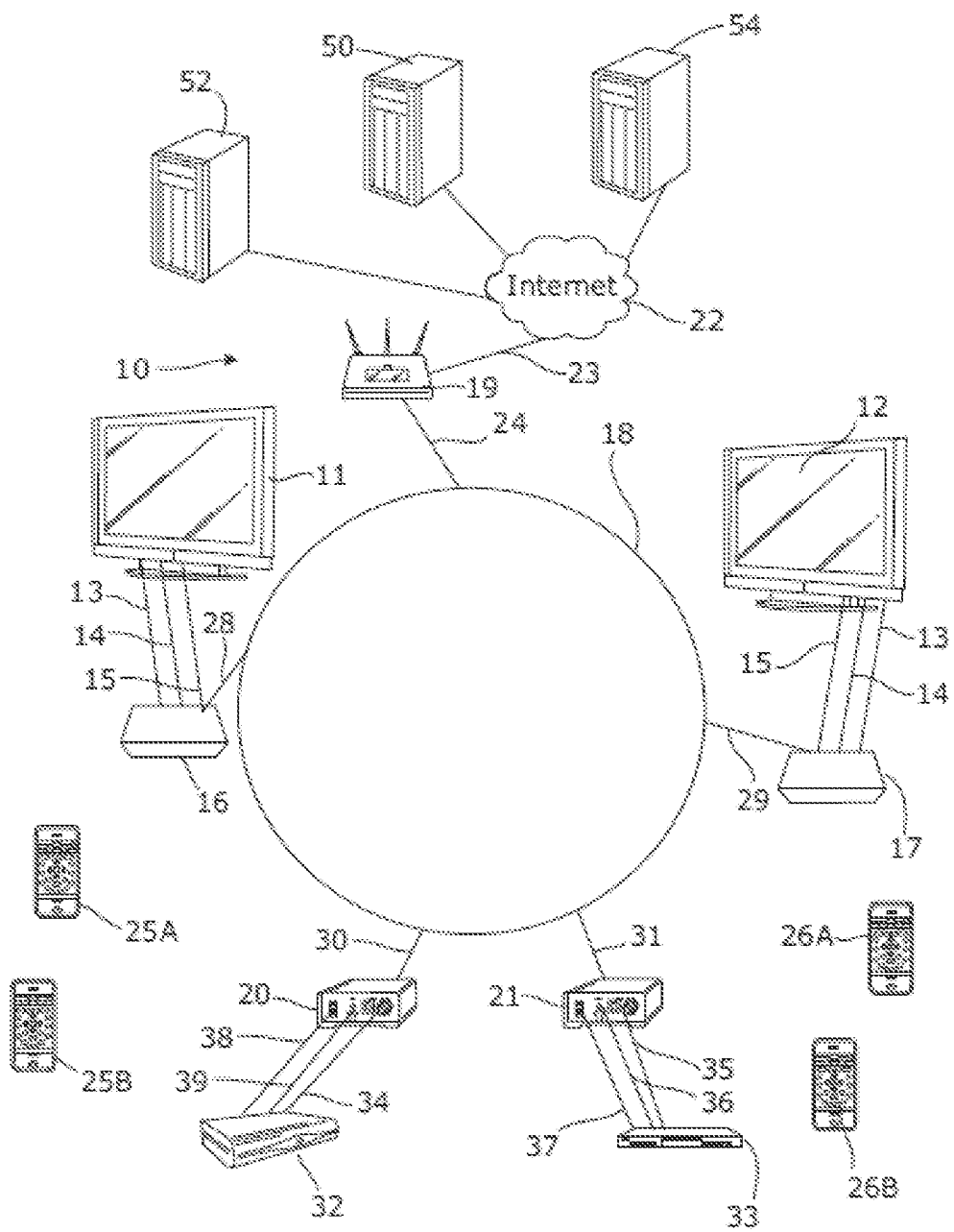

MULTIZONE AUDIO-VISUAL SYSTEM

CROSS-REFERENCE TO RELATED APPLICATIONS

This application is the U.S. National Stage of International (PCT) Patent Application No. PCT/GB2011/001576, filed on Nov. 9, 2011, which claims priority to U.K. Application No. GB1019871.1, filed Nov. 24, 2010, the disclosures of which are hereby incorporated by reference in their entirety.

FIELD OF THE INVENTION

The field of the present invention relates to systems for operating multizone audio-visual equipment. More particularly, the field of the present invention relates to, among other things, systems for regulating the operation of one or more items of equipment. The invention also relates to systems that include multizoned equipment, and means for regulating the operation of such equipment.

BACKGROUND OF THE INVENTION

Systems for controlling the operation of equipment located in a plurality of zones are known. In the case of audio-visual ("AV") equipment, such as television sets ("TVs") located in different zones of a location, such as different rooms of a building (e.g., a domestic house), the operation of such AV equipment has been effected by analogue signals employing an 8×8 matrix of audio-visual delivery with infrared ("IR") resend from each room to a central control location from where all the source data is derived. The provision of source data at the central location is from known source devices such as DVD, CD, Satellite, MP3, and other known devices. All the cabling of these systems must link each item of AV equipment to the central location. As a result, such known systems involve a considerable amount of cabling. Moreover, such cabling requires adaption of the building, if the cabling is not to be unsightly and/or the cabling must be installed via holes drilled through walls to connect the central location to each piece of AV equipment. These known systems are consequently relatively expensive.

In view of the foregoing, an object of the present invention is to provide a device and system that is an improvement compared to known devices and systems and/or which mitigates the drawbacks of such known devices and systems.

SUMMARY OF THE INVENTION

The present invention provides an AV system. References herein to "Ethernet" also include references to the alternative term "Ethernet network". The device and system of the invention enables an unlimited matrix of inputs to any number of equipment, such as AV equipment, and outputs from an unlimited number of sources and source devices, with minimal amounts of cabling or adaption of a building in which they are located.

The invention is now further described with reference to a non-limiting embodiment thereof, given by way of example only, and with reference to the accompanying drawing.

BRIEF DESCRIPTION OF THE FIGURES

FIG. 1 is a diagrammatic representation of a system for regulating the operation of a plurality of electrical and/or electronic equipment components disposed in respective different zones (such as rooms) of a location, such as a building.

DETAILED DESCRIPTION OF THE INVENTION

Referring now to FIG. 1, the system is generally indicated by reference number 10, and comprises two or more items of equipment, which in this instance, are both television receivers ("TVs") 11,12 with display/monitor screens. The TVs 11,12 may be of the same or different types, and may receive audio signals, video signals, RS232 and/or infrared ("IR") signals via respective routes indicated by 13 (audio signals), 14 (video signals) and 15 (IR signals and/or RS232 signals) from respective nodes 16,17. The term "node" as used herein is to be understood as synonymous with the term "Set Top Box" (STB) and any equivalent device, which is well-known in the art. Each node comprises a decoder of known type and a transmitter of known type. Suitable decoders for the nodes are sold under the trade name Aminet110 available from Amino Technologies plc. Suitable transmitters are sold under the trade name Global Cache available from Global Cache Inc.

The audio and/or video signals are preferably conveyed by suitable cables to the TVs where they are connected in the conventional manner. The IR signals are preferably conveyed in a conventional manner to conventional IR receptors (not shown) at the TVs. The audio, video and IR signals act on the TVs in the conventional manner.

The nodes 16,17 receive Transmission Control Protocol/Internet Protocol (TCP/IP) data signals from an Ethernet 18 via respective spurs 28,29. The Ethernet 18 has multiple multi-casts or uni-casts, e.g., corresponding to multiple TCP/IP data sets such as Internet, LAN, WAN, etc. Other devices are connected to the Ethernet 18 by respective spurs. The other devices connected to the Ethernet include a router 19 and one or more instreamers 20,21. The router as depicted is wireless-enabled, but it could equally well be hard-wired. The instreamers each comprise a receiver (i.e., a decoder-encoder) of known type and a transmitter of known type. Suitable receivers are sold under the trade name AVN200 by Visionary Solutions Inc. Suitable transmitters are those sold under the trade name Global Cache and available from Global Cache Inc. Preferably, the receiver and transmitter are on the same motherboard. Preferably, the instreamer comprises an IP-controlled amplifier operable to amplify audio signals from the decoder function of the receiver. The router 19 may be of a known type (such as that sold under the well-known trade name Netgear) operable to receive TCP/IP data signals from the Internet (indicated by 22) via a suitable Internet link 23. The router 19 is also adapted to receive TCP/IP data signals by wireless transmission from one or more hand-held TCP/IP Human Interface Devices ("HIDs") 25A, 25B, 26A, 26B of any suitable known type. HIDs 25A and 25B form (part of) a synchronised group of HIDs 25, and HIDs 26A and 26B form (part of) a different synchronised group of HIDs 26. The term "synchronised" in relation to the HIDs in each group means that a change in the operating status of one HID of the group is replicated by the same change in all the other HIDs of that group. In the drawing, there are two synchronised HIDs in each group, but it is to be understood that there may be more or less HIDs in each group. HIDs are also known as Remote Control Devices or more simply as "remotes". A suitable HID is sold under the trade name/designation iPOD and available from Apple Corporation. In the system 10, there is provided one HID for each TV 11, 12, etc. HID 25 (i.e., the synchronised group 25A, 25B, etc.) is for regulation and control of TV 11 and HID 26 (i.e., the synchronised group 26A, 26B, etc.) is for regulation and control of TV 12, as described herein.

The router 19 is adapted to provide communication via the link 23 and the Internet 22 with a control server 50. The control server 50 operates to monitor and record all TCP/IP signals in the system 10, e.g., signals from the control devices of the system 10, e.g., the HIDs 25A, 25B, 26A, 26B, the nodes 16,17 and the instreamers 20,21 and synchronises the interactions of the control devices of the system with the software functions of the devices. The method and means for the interactions of the control server 50 and the control devices and the software involved would be apparent to persons of ordinary skill in the art. As indicated, the control server 50 operates to receive and record data from the router 19. The data thus received and recorded includes data indicative of the operating status of the nodes, HIDs and instreamers, which includes data indicative of the status or mode (e.g., "on", "off", "stand-by", etc.) of the TVs 11 and 12, and their operating configuration (e.g., the TV channel being displayed), and the times of change of the operating status and/or configuration of TVs 11 and 12.

The instreamers 20,21 are connected via respective spur connections ("spurs") 30,31 to the Ethernet 18. Each instreamer 20,21 is operatively associated with source devices, which serve to provide sources of data. The source devices may include an audio device or a video device or an audio-video device, these devices being collectively referred to herein as audio-visual devices or AVs. Instreamer 20 is operatively associated with AV 32 and instreamer 21 is operatively associated with AV 33. The AVs 32,33 can be TV receivers, radio receivers (preferably digital radio receivers), video recorders, digital versatile disc (DVD), e.g., digital video disc, (DVD) recorders/players, cameras (e.g., security cameras) and/or other audio and/or video devices and/or Blue-Ray systems. The instreamers 20,21 each comprise a transmitter (not shown) referred to below. The respective transmitters of the instreamers 20,21 operate in the known manner to provide IR or RS232 signals to their respective AVs 32,33. The IR or RS232 signals from the transmitter of the instreamer 20 to AV 32 are indicated by line 34, and the IR or RS232 signals from the transmitter of the instreamer 21 to AV 33 are indicated by line 35. The IR or RS232 signals cause the AVs 32,33 to operate in a predetermined manner, including a default operating manner which might be "off" (i.e., inoperative or on stand-by). When the instreamers 20,21 are activated, they each generate unicast TCP/IP data signals or multicast TCP/IP data signals (in response to TCP/IP data signals received from the router 19) which are passed to the Ethernet 18. The nodes 16,17 are set up with default arrangements to log onto and receive TCP/IP data signals from specified instreamers 20,21. In the embodiment described herein, the node 16 has a default mode in which it logs onto and receives TCP/IP data signals from instreamer 20. Similarly, the default mode of node 17 is for logging onto and receiving TCP/IP data signals from instreamer 21. Operation of the HIDs 25,26 in a suitable way (described herein) causes the nodes to operate in a non-default mode in which each node can log onto and receive TCP/IP data signals from another non-default instreamer.

The system 10 comprises a web server 52. The web server 52 is adapted and arranged to communicate with the control server 50 either via the internet (as shown) or by hard-wiring. The web server 52 operates to store information about the status, configuration and related status/configuration timings for the TVs 11,12 and the source devices, AVs 32 and 33. The web server 52 is accessible using an Internet browser (not shown) to generate control signals. The control signals are polled (e.g., periodically) in the known manner by one or more of the nodes 16,17 and/or by one or more of the HIDs 25,26 and/or by one of the instreamer(s) 20,21 to change and/or monitor the operating status and/or operating configuration of one or more source devices (e.g., AVs 32,33 and/or other equipment). The operating status and/or configuration of the source devices may include, for example, the settings of one or more AVs, cameras, curtains, central heating systems, PCs, inter alia. The polling is effected in a manner which is known in the art.

The system 10 comprises a content server 54. The content server 54 communicates with the control server 50 via the Internet or by suitable wiring. The content server 54 is adapted and arranged to receive status and/or configuration data from the control server 50, and is programmed to respond to the data by generating from suitable sources (not shown) information data (e.g., advertisements, information) at selected conditions of time, status and/or configuration of the TVs 11,12. The information data is transmitted, during operation, via the router 19 to the Ethernet 18 and to one or more selected HIDs 25,26 and/or to one or more selected nodes 16,17 so that the information data is included with the AV output of the respective HIDs 25,26 and/or the respective TVs 11,12. The information data could comprise information (e.g., advertisements, official notices, etc.) which could have relevance to the output of the TVs 11,12.

The system 10 as described is operated as follows: A human operative (not shown) requiring certain audio-visual effects at one of the TVs, say TV 11, operates the corresponding HID 25 to select (e.g.) television (as opposed to video, DVD, radio, camera, etc.). This operation of the HID 25 produces a TCP/IP data signal which is received by the router 19. The router 19 responds by generating a Wake-On LAN TCP/IP data signal which passes via spur 24 to the Ethernet 18. The signals are received by the node 16 and cause the node 16 to be activated (i.e., "switched on") if it is not already switched on. The human operative then operates the HID 25 to produce a second TCP/IP data signal. The latter signal is received by the router 19 which responds by generating suitable TCP/IP data signals which pass via the Ethernet 18 from which they are received by the node 16. The node 16 responds to these signals by generating IR or RS232 signals which are passed to the TV 11 (e.g., via line 15). The IR or RS232 signals received by the TV 11 cause the TV 11 to switch from an "off" mode to an "on" or "stand-by" mode. The operative then operates the HID 25 to generate a third TCP/IP data signal which is received by the router 19. The router 19 responds to the third signal by producing a suitable TCP/IP data signal which passes via the Ethernet 18 to the node 16. The node 16 responds to the TCP/IP data signal selecting the default multi-cast stream of TCP/IP data for receiving selected audio and/or video data signals from device 32, thereby providing the human operative with the desired audio and/or video effects at TV 11. The various TCP/IP data signals and their mode of generation would be well-known to those skilled in the art.

If the human operative wishes TV 11 to provide audiovisual operation corresponding to a non-default channel, he/she operates the HID 25 to generate a TCP/IP data signal corresponding to the desired non-default channel. This signal is received by the router 19 which generates corresponding TCP/IP data signals which pass to the Ethernet 18 and spur 30 to instreamer 20. The transmitter of the instreamer receives the signals and responds thereto by generating a corresponding IR or RS232 signal which passes via line 34 to AV 32 causing the latter to select the desired non-default television channel. The audio and video signals of the desired channel pass via lines 38,39 to the instreamer 20 which responds by generating TCP/IP data signals corresponding to the desired non-default channel. The latter pass via the spur 30, the Ethernet 18 and spur 28 to node 16 which operates in response to the signals to generate audio-visual signals corresponding to the desired non-default television channel. These signals are received by the TV 11 via lines 13,14 and cause the TV 11 to operate on the desired television channel.

The foregoing has been described with reference to the HID 25, TV 11 and AV 32. It will be understood that the same type of functioning applies equally to HID 26, TV 12 and AV 33. Moreover, HID 25 and/or HID 26 can be operated to cause the router 19 to select Internet TCP/IP data for use on TV 11 and/or TV 12 if so desired. Internet TCP/IP data is obtained by the router 19 from the Internet 22 via connection line 23 upon receiving an appropriate signal from any HID (e.g., HID 25 or 26 etc.). The Internet data is relayed by the router 19 to the Ethernet 18 and then via one of the spurs 28,29 to one of the nodes 16 or 17 for use with one or both of the TVs 11,12.

The operation of the system 10 is preferably pre-programmed in the HIDs. The pre-programming would be effected in a manner known to those skilled in the art. Each node 16,17 comprises a decoder (not shown) of known type, and one or more transmitters (not shown) of known type. A suitable decoder is sold under the trade name/designation Aminet110 available from Amino Technologies plc. A suitable transmitter is sold under the trade name Global Cache available from Global Cache Inc. The transmitter(s) is/are connected to receive TCP/IP data signals from the Ethernet 18 (e.g., via respective spurs 28,29). The decoder and the transmitter(s) each have a respective IP (Internet protocol) port number and respective single static IP addresses. The decoder is arranged to receive an input of TCP/IP data for its single IP port number and its static IP address, and is operable to produce a corresponding output of AV data for use by the associated TV (e.g., TV 11 or TV 12). The transmitter receives TCP/IP data from the Ethernet 18 and responds thereto by producing a corresponding output of IR data signals and/or RS232 data signals. The IR and/or RS232 data signals are employed to select the operation and mode of operation of the respective TV or TVs (e.g., TV 11 and/or TV 12).

The decoder and transmitter(s) of each node 16,17 are preferably contained in a single common casing or housing (not shown). This has the advantage of simplifying installation and reducing costs. The casing or housing may also contain a suitable IP-controllable amplifier (not shown) of known type to amplify audio signals from the decoder. A suitable IP-controllable amplifier is sold under the trade name Netstreams 250 available from Netstream LLC. The decoder and transmitter(s) of each node 16,17 etc. are preferably on a single mother-board (not shown) which provides savings in cost and the size of each node. The IP-controllable amplifier may be mounted on the casing or housing of the node. In an advantageous arrangement, the amplifier is sandwiched between the casing or housing and a heat sink. These arrangements provide further cost and space savings. Although the features of the nodes 16,17 are not described in detail, they are well-known items of equipment and would be known to those skilled in the art.

The instreamers 20,21 preferably comprise at least one encoder (not shown) and one or more transmitters. Suitable encoders are well-known, and are available under the trade name AVN200 available from Visionary Solutions Inc. Suitable transmitters are well-known and available under the trade name Global Cache available from Global Cache Inc. The transmitter(s) is/are connected to receive TCP/IP data signals from the Ethernet 18. The encoder and transmitter(s) of each instreamer each have a respective single IP port number and the same single static IP address. The encoder is connected to the Ethernet 18 for the receipt and transmission of TCP/IP data signals. The respective transmitter is operable to generate IR and/or RS232 signals in response to TCP/IP signals received from the Ethernet 18. The IR and/or RS232 signals are employed to regulate the operation of the AV equipment 32,33. IR and/or RS232 signals pass from the encoders of the instreamers 16,17 via respective lines 34,35. In preferred embodiments, the encoder and transmitter(s) of each instreamer are on a single motherboard (not shown). Preferably, the encoder and transmitter(s) of each instreamer are located in a common housing. These preferred embodiments advantageously result in reduced costs and reduced space requirements.

The foregoing description refers to a system having two TVs, TV 11 and TV 12 and their corresponding HIDs 25,26 and nodes 16,17. However, it is to be understood that there may be more than two TVs and a corresponding number of nodes. The TVs are preferably each located in respective zones, e.g., respective rooms of a building. There may be more than two instreamers and associated corresponding AV devices functioning similarly to devices 32,33 connected to the Ethernet in a manner like that described with reference to the instreamers 20,21 and the devices 32,33.

The Ethernet 18 may be any suitable electrically-conductive conductor at the site containing the zones (e.g., the site of a building). The Ethernet conductor may be water pipes, central heating pipes, telephone wires. In one embodiment, the Ethernet 18 may be provided by the electricity-distribution cables within the building. This embodiment has the advantage that it uses cables which are installed in a building or at a site, so that no additional cables have to be installed to accommodate the system resulting in cost-savings. In preferred embodiments, the Ethernet may be comprised of Category 5-6 cables.

In instances where electricity distribution cables of a building serve as the Ethernet, the only additional cables required to connect items of equipment used in the system are the local speaker cables from the nodes to optional speakers (if present). Other items of equipment, such as satellite receivers, DVDs, CD players, MP3s and other devices, can be installed anywhere on the Ethernet network and connected via one or more suitable instreamers. The system of the invention is relatively cheap, and involves low costs for installation compared to previous systems for the same type of results.

What is claimed is:

1. An audio-visual system comprising:
   (a) at least one audio-visual device which is operable to provide information, in a form selected from the group consisting of audio information and visual information, to a user;
   (b) a set-top box associated with each audio-visual device;
   (c) a router;
   (d) an Ethernet connection between each set-top box and the router;
   (e) a control server which operates to receive and record data from the router, the data including data indicative of an operating status each audio-visual device, an operating configuration, and a time of each change of status and configuration; and
   (f) at least two human interface devices for each audio-visual device, each human interface device being operable to generate TCP/IP signals representative of a desired status or configuration of a selected audio-visual device, the router being operative to receive and route the TCP/IP signals from the human interface devices via the Ethernet to the respective set-top box which is configured, in response to the TCP/IP signals, to set the status and configuration of the audio-visual device to a desired status and configuration, wherein said human interface devices operate to be automatically synchronised to a same status and configuration.

2. The system of claim 1 in which the audio-visual device comprises a television set, and the operating status comprises "on", "off", or "stand-by", and wherein the operating configuration comprises a TV channel.

3. The system of claim 1 in which the router is connected to the Ethernet to receive data from the control server, the set-top box, and the human interface devices.

4. The system of claim 1, wherein:
a set-top box associated with a respective audio-visual device is configured to receive (a) TCP/IP status information and (b) configuration signals originated from a human interface device or the control server;
the set-top box is operable to generate signals selected from the group consisting of infra-red signals and RS232 signals, in response to the TCP/IP status information or configuration signals;
each audio-visual device is arranged to receive and respond to signals selected from the group consisting of infra-red signals and RS232 signals from the respective set-top box to set the operating status or configuration of the audio-visual device; and
the audio-visual device is operable to generate corresponding signals selected from the group consisting of audio signals and video signals in response to the infra-red signals or RS232 signals.

5. The system of claim 1 further comprising one or more source devices operable to generate audio data, video data, or combinations thereof, wherein each source device is associated with, and configured to communicate with, a respective instreamer which is connected to the Ethernet, wherein each instreamer is operable to provide TCP/IP data on the Ethernet which is representative of the said audio and video data available from the respective source device.

6. The system of claim 5, wherein each source device is selected from the group consisting of: digital video disc players, Blue-Ray systems, digital cameras, compact disc players, closed-circuit televisions, set-top boxes, MP3s, personal computers, and domestic equipment.

7. The system of claim 5, wherein each instreamer comprises an encoder and a transmitter which operates to transmit IR signals, RS232 signals, or combinations thereof.

8. The system of claim 5, wherein an instreamer associated with a respective source device is connected to receive TCP/IP status or configuration signals originated from at least one device selected from a human interface device and the control server, and operable to generate infra-red or RS232 signals in response to the status or configuration signals, wherein each source device is connected to receive infra-red signals or RS232 signals from the respective instreamer to set the status or configuration of the source device, the source device being operable to generate corresponding audio signals, video signals, or audio and video signals, and the corresponding instreamer is connected to receive the audio signals, video signals, or audio and video signals from the respective source device and is configured to operate in response thereto to generate corresponding TCP/IP signals, wherein the instreamer is connected to the Ethernet to enable said corresponding TCP/IP signals to pass to one or more desired set-top boxes.

9. The system of claim 1, wherein the router is configured to receive data signals from the control server, the set-top boxes, the human interface devices, one or more instreamers, or combinations thereof.

10. The system of claim 1, wherein the control server is connected to receive data signals via the router from the set-top boxes, human interface devices, one or more instreamers, or combinations thereof.

11. The system of claim 10, wherein an instreamer associated with a respective source device is connected to receive TCP/IP status or configuration signals originated from at least one device selected from a human interface device and the control server, and operable to generate infra-red or RS232 signals in response to the status or configuration signals, wherein each source device is connected to receive infra-red signals or RS232 signals from the respective instreamer to set the status or configuration of the source device, the source device being operable to generate corresponding audio signals, video signals, or audio and video signals, and the corresponding instreamer is connected to receive the audio signals, video signals, or audio and video signals from the respective source device and is configured to operate in response thereto to generate corresponding TCP/IP signals, wherein the instreamer is connected to the Ethernet to enable said corresponding TCP/IP signals to pass to one or more desired set-top boxes.

12. The system of claim 1, further comprising a content server which is arranged to receive status and configuration data from the control server and which operates to respond to the data by generating information data at selected conditions of time, status and configuration of the audio-visual device, which information data is, during operation, transmitted via the router to the Ethernet and to at least one device selected from one or more human interface devices and a respective set-top box, so as to be included with the audio-visual output of the human interface devices, the respective audio-visual device, or combinations thereof.

13. The system of claim 1, further comprising a web server which operates to store information about the status, configuration and related status and configuration time for all audio-visual devices and sources of the system, the web server being accessible by means of an internet browser, the web server being operable via the internet browser to generate control signals which are polled (a) by one or more set-top boxes, (b) by one or more human interface devices, (c) by one or more instreamers, or (d) by combinations of (a), (b) and (c), via the internet and the router, in order to change the status, configuration, or status and configuration, or one or more source devices of audio signals, video signals, or audio and video signals.

* * * * *